US007609587B2

(12) United States Patent
Zimmermann et al.

(10) Patent No.: US 7,609,587 B2
(45) Date of Patent: Oct. 27, 2009

(54) LUNAR PHASE DISPLAY MECHANISM

(75) Inventors: Denis Zimmermann, Kreuzlingen (CH); Rene Larsonneur, Winterthur (CH); Philipp Buhler, Zurich (CH)

(73) Assignee: Richemont International SA, Villars-sur-Glane (CH)

( * ) Notice: Subject to any disclaimer, the term of this patent is extended or adjusted under 35 U.S.C. 154(b) by 198 days.

(21) Appl. No.: 11/392,849

(22) Filed: Mar. 30, 2006

(65) Prior Publication Data

US 2006/0221771 A1 Oct. 5, 2006

(30) Foreign Application Priority Data

Mar. 31, 2005 (CH) .................................... 0578/05

(51) Int. Cl.
*G04B 19/26* (2006.01)
*G09B 23/00* (2006.01)

(52) U.S. Cl. ........................................ 368/18; 434/292

(58) Field of Classification Search ............. 368/15–20; 434/281, 284, 291, 292
See application file for complete search history.

(56) References Cited

U.S. PATENT DOCUMENTS 4,681,459 A 7/1987 Nabeyama et al.
4,881,213 A * 11/1989 Zaslawsky ................... 368/15
5,086,417 A * 2/1992 Kerr ............................ 368/19
5,802,016 A * 9/1998 Kubota et al. ................. 368/11
6,885,614 B2 * 4/2005 Rey-Mermet ................ 368/16
2004/1015626 * 8/2004 Plange et al. ................. 368/17

FOREIGN PATENT DOCUMENTS

| | | |
|---|---|---|
| DE | 36 02 976 | 8/1986 |
| DE | 87 00 114 | 6/1987 |
| DE | 44 12 702 | 9/1995 |
| EP | 0 107 177 | 5/1984 |
| EP | 1 445 672 | 8/2004 |
| FR | 2 790 564 | 9/2000 |
| JP | 46.555/82 | 10/1982 |
| JP | 60-60580 | 4/1985 |
| JP | 1-14551 | 3/1989 |
| JP | 5-39276 | 6/1993 |
| JP | 5-54080 | 8/1993 |
| JP | 8-20527 | 3/1996 |

* cited by examiner

*Primary Examiner*—Vit W Miska
(74) *Attorney, Agent, or Firm*—Young & Thompson

(57) ABSTRACT

A lunar phase display mechanism includes an upper disc which is the lunar display disc and a lower disc mounted concentrically to this disc. One of the discs is mounted so that during normal operation of the mechanism that one disc rotates relative to the other disc, and the other disc is mounted in a stationary position during normal operation of the mechanism while this position can be changed by a rotary motion. The gear train driving the rotating disc allows that the direction of rotation of this disc can be reversed so that the different appearance of the lunar phases at the latitudes of the earth and, in particular, in the northern and southern hemisphere can be taken into account in the display.

20 Claims, 7 Drawing Sheets

LUNAR PHASE DISPLAY MECHANISM

BACKGROUND OF THE INVENTION

The present invention relates to a lunar phase display mechanism having an upper disc, the lunar display disc, and a lower disc, the lunar disc, mounted concentrically to the upper disc, one of these discs being mounted in such a way that it rotates relative to the other disc during normal operation of the mechanism.

DESCRIPTION OF THE RELATED ART

Such mechanisms basically are known, particularly so in complex watches, and are used for instance as a secondary display in wristwatches. However, the lunar phases seen by an observer have an appearance that differs depending on his position on the globe, in particular on the latitude, in a way already explained in the European patent application EP 1 445 672 originating from the International Watch Corporation (IWC). The part of the lunar surface that is illuminated by the sun and can be seen by an observer on earth depends in fact on the relative positions of the sun, earth and moon, and the effective view that the observer has of this visible part moreover depends on the observer's position on the globe. For instance, an observer in the northern hemisphere perceives the illuminated part of the waxing moon—depending on the latitude of his exact location and on the season of the year—approximately on the right-hand side of the lunar surface, while for an observer in the southern hemisphere this part appears to the left, since he observes the same situation as it were upside down. For the waning moon, this is exactly the reverse. In principle, a vertical (waxing) crescent seen to the left or right corresponds—as a function of the seasons—to observer locations at the North and South Pole of the earth, respectively, but to observers in latitudes between the poles the waxing or waning crescent has an inclined orientation between said extremes, and at the equator, for instance, it appears in a horizontal position.

Traditional lunar phase displays usually disregard these differences, or have been conceived for the views in the northern hemisphere.

The IWC patent application mentioned above proposes a mechanism able to account for the basic difference of perception of the lunar phases in the northern and southern hemisphere. Here a display of the lunar phases that is correct in this respect is offered for the two hemispheres simultaneously, by including a lunar display disc having two windows that is mounted rotatably above a fixed lunar disc having an appropriate background scene. However, said mechanism yields neither a selective display of the lunar phases in a shape close to reality just in one hemisphere nor a realistic display that would account for further aspects such as the inclined crescents seen at latitudes between the poles.

SUMMARY OF THE INVENTION

Therefore, it is an object of the present invention, in contrast to known devices of this kind, to realise a lunar phase display that allows, by choice, to account in the display for the different appearance of the lunar phases as seen from the earth either on the northern or the southern hemisphere and more particularly at the latitudes between the poles as well, and that allows by simple means to render as realistic as possible the position as well as the size of the bright and dark parts of the lunar surface as they are seen from earth.

Thus, object of the present invention is a mechanism for display of the lunar phases that has the characteristic features disclosed below, these solutions being alternatives with respect to their basic aptitude to display the lunar phases in a selected one of the two hemispheres.

The mechanism of the invention is characterised more particularly by the fact that the disc that does not rotate during normal operation of the mechanism is mounted in such a way that during normal operation of the mechanism it is in a stationary position but that this position can be adjusted by a rotary motion so as to account in the display for the different views offered by the lunar phases at the latitudes of earth, and particularly so in the northern and southern hemisphere.

In this way it is possible with a single watch and simple adjustment of this disc, that is, without any structural changes, to display either the lunar phases as they are seen in the northern or southern hemisphere, or with fine adjustment of this disc; to account for the inclined position of the crescent that is seen by observers.

The mechanism of the invention is also distinguished by having a gear train driving the rotating disc that is such that the direction of rotation of this disc can be reversed so as to account in the display for the different appearance of the lunar phases in the northern and southern hemisphere of the earth.

This is an alternative to the first named solution, such that with a simple adjustment in a given watch the lunar phases can be displayed as seen either in the northern or in the southern hemisphere, so that such a watch is not restricted to display the lunar phases in one of the hemispheres.

These features can be applied to a number of embodiments of a mechanism according to the invention, and the characteristics and advantages of these embodiments will appear from the dependent claims and from the following description presenting the invention in detail with the help of drawings.

BRIEF DESCRIPTION OF THE DRAWINGS

The appended drawings represent schematically and by way of example several embodiments of a lunar phase display mechanism according to the present invention.

DESCRIPTION OF THE PREFERRED EMBODIMENT

The invention will now be described in detail while referring to the appended drawings.

Figures 1A, 1B, 2, 3:
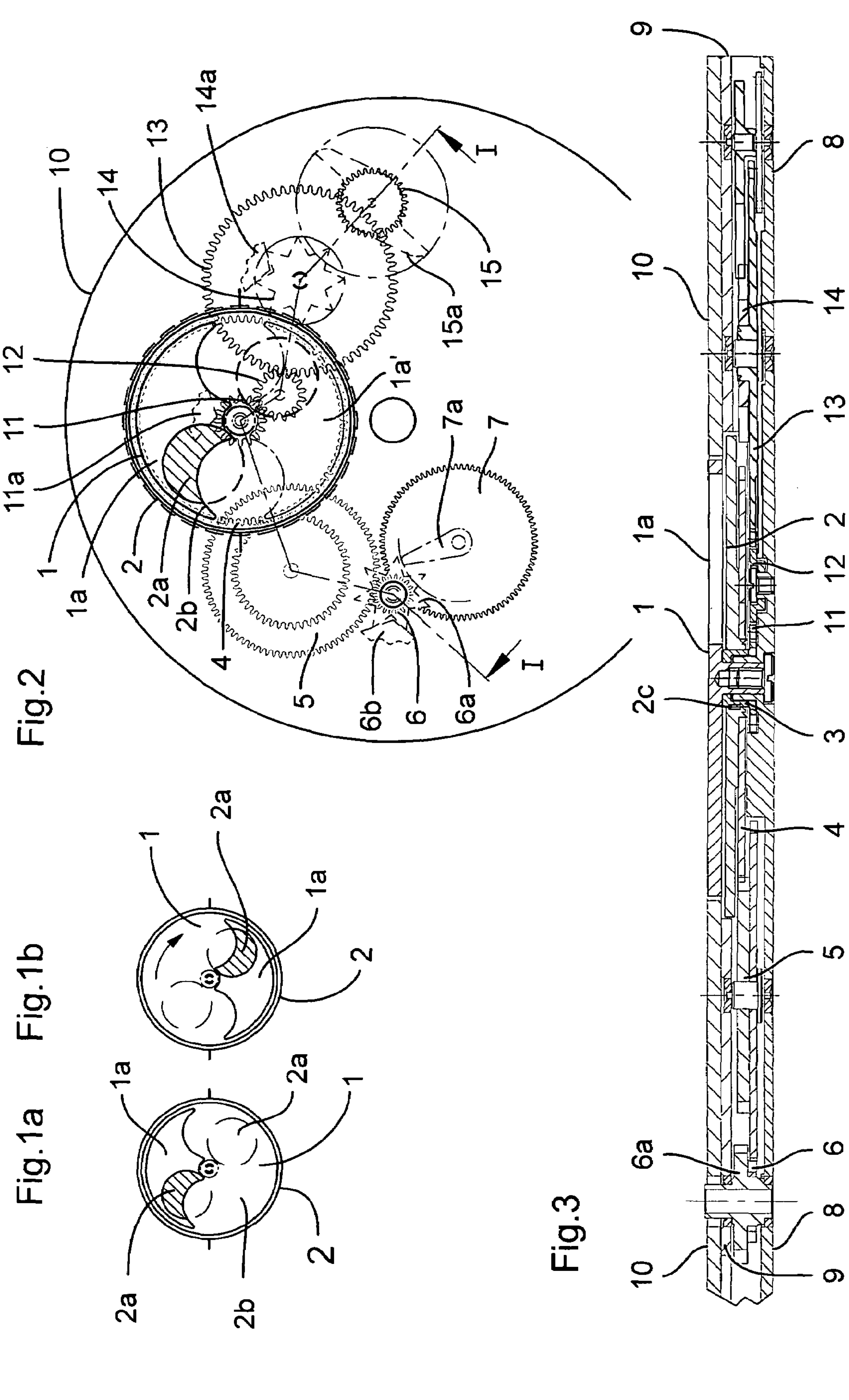
FIGS. 1*a* and 1*b* schematically illustrate the principle of a first embodiment of such a mechanism having a lunar display disc with a window and a lunar disc with appropriate graphic design where the lunar phases are displayed either for the northern or for the southern hemisphere.
FIG. 2 is a plan view of the lunar phase display mechanism of FIGS. 1*a* and 1*b* including an example of the gear train driving the lunar disc as well as of an adjusting mechanism intended to set the stationary position of the lunar display disc.
FIG. 3 is a section along the line I-I through the mechanism of FIG. 2.

The principle of a mechanism according to the present invention will first be outlined with the help of FIGS. 1*a* and 1*b*.

A lunar phase display mechanism in accordance with the present invention has a first, upper disc which is called lunar display disc 1. In the first embodiment, this disc 1 is fitted with one window 1*a* as schematically shown in FIG. 1*a*. Here this window is formed as an outwardly arched shape having two further arched segments inside, such as is generally customary in lunar phase displays.

Such a mechanism further includes another, lower disc which is called the lunar disc 2. This lunar disc 2 is placed concentrically beneath the lunar display disc 1, as shown schematically in FIG. 1*a*, and functions as it were as a background scene seen through window 1*a* of the lunar display disc 1. To this end, a graphic design which, in combination with window 1*a* of the lunar display disc 1, is suitable for displaying the lunar phases is applied to its surface facing the lunar display disc 1. In the embodiment according to FIGS. 1*a* and 1*b*, the lunar disc 2 for instance bears two bright circular areas 2*a* having a size that corresponds to the arched segments of window 1*a*, against a dark background 2*b*.

In this embodiment, the lunar disc 2 is mounted in such a way that during normal operation of the mechanism it rotates relative to the lunar display disc 1 while the latter is immobile. This corresponds to the configuration of known lunar phase displays where the lunar display disc 1, in known clocks or watches, normally is part of the dial and window 1*a* is cut into said dial. As window 1*a* in the lunar display disc 1 or, rather, in the dial of known clocks or watches is usually facing upward and the lunar disc 2 normally rotates clockwise, the lunar phases therefore are only displayed in principally correct manner for the northern hemisphere, but not in detail as for example with respect to the inclination of the crescents.

According to the invention, the lunar display disc 1, on the one hand, is fashioned explicitly as a disc in the plane of the dial that is separate from the dial, and mounted in such a way, on the other hand, that during normal operation of the mechanism it is in a stationary position, but this position can be adjusted by a rotary motion so that the display will account for the different appearance offered by the lunar phases at latitudes of the earth, and more particularly in the northern and southern hemisphere. In the embodiment represented schematically in FIGS. 1*a* and 1*b*, the lunar display disc 1 can be rotated by 180° so that window 1*a* may face up or down. Thus, the adjustably mounted disc, here the lunar display disc 1, has (at least) two stationary positions that are apart from each another by an angle of 180° so that it can display the lunar phases either in the northern hemisphere or in the southern hemisphere in a basically correct way, according to the above introductory explanations.

A mechanism conceived for this embodiment is represented in FIGS. 2 and 3 in a top view and in section.

The two figures show on the one hand to the left an example of the gear train driving the lunar disc 2, and on the other hand to the right an example of an adjusting mechanism serving to set the stationary position of lunar display disc 1.

Here the mechanism is integrated into a watch having a perpetual calendar, as an obvious example similar to that described in patent documents EP 0 191 921 and DE 3 505 733, where not all the components are important for the lunar phase display mechanism, and hence are not taken into account in the figures. FIG. 2 is a top view including the parts located beneath a dial 10 of the watch.

A 24-hour wheel 7 making one revolution in 24 hours bears a finger 7*a* driving a weekday star 6*a* mounted on a weekday wheel 6, these parts being mounted between a plate 8 and a bridge 9. Star 6*a* thus is advanced by one tooth once a day, normally at midnight and clockwise. A catch 6*b* secures the weekday star 6*a* against inadvertent rotation. The weekday wheel 6 in its turn drives a lunar disc wheel 4 via a lunar phase intermediate wheel 5. It can be seen more particularly from FIG. 3 representing a section along the line I-I in FIG. 2 that in this embodiment the lunar disc wheel 4 and the lunar disc 2 are integrally connected so as to turn together in synchronised fashion about a pipe 3. To this end a through hole 2*c* is formed for pipe 3 in the centre of lunar disc 2 and lunar disc wheel 4.

The lunar display disc 1 which is fastened to the upper end of pipe 3 is sitting at a safe distance above the lunar disc 2, and at about the same level as the dial 10. The assembly comprising the lunar display disc 1 and the pipe 3 is mounted rotatably on plate 8 while enveloping the lunar disc 2 and the lunar disc wheel 4 with slight play; thus, the lunar display disc 1 is an element rotating within dial 10. At its lower end, pipe 3 is further connected with a lunar display wheel 11 engaged with a lunar display intermediate wheel 12. This is engaged with a further intermediate wheel 13 supporting an intermediate wheel star 14 that can be advanced by a finger 15*a* of a corrector wheel 15. The corrector wheel 15 is operated with a crown that is not represented. Both the lunar display wheel 11 (and with it the pipe 3 and the lunar display disc 1) and the intermediate wheel star 14 are secured against undesired rotation by associated catches 11*a* and 14*a* in a set stationary position.

As to the functioning, in this embodiment of the mechanism the lunar disc 2 daily rotates through a certain angle. This angle depends on the rotating speed that has been selected, which must be selected as a function of graphic design of the lunar disc 2 and of the shape of window 1*a* in the lunar display disc 1, insofar as more than two bright circular areas could be present on the lunar disc 2, depending on the size of the window, for instance four. This rotating speed is set via a suitable reduction gear between the weekday star 6*a* and the lunar disc wheel 4, in a way sufficiently well known to one skilled in the art.

Because of the rotation performed by the assembly of lunar disc wheel 4 and lunar disc 2, therefore, in the present embodiment the surface of the lunar disc 2 facing the lunar display disc 1 above it becomes visible successively in window 1*a* together with the background scene shown on this surface, resulting in a representation of the current lunar phase in dial 10.

Using the crown and associated setting gear train between a corrector wheel 15 and the lunar display wheel 11, moreover, window 1*a* can be oriented so as to face up or down, as shown in FIG. 2 with the dash-dotted position 1*a*'. Gear train 11-15 of the adjusting mechanism serving to set the stationary position of lunar display disc 1 has the appropriate gear ratio, so that one full turn of the crown for instance will produce a rotation of the lunar display disc 1 by 180°. Thus, by setting one of the two stationary positions of this disc 1, a display of the lunar phases in the northern or southern hemisphere can be selected.

The 24-hour wheel 7 mentioned above that drives the weekday star 6*a* can itself be driven by the dial train via an hour wheel that is not included in the drawing but makes one revolution in 12 hours.

An alternative to driving the weekday star 6*a* via the 24-hour wheel 7 would for instance be a control lever advancing once a day at midnight the weekday star 6*a* by one tooth, or similar means sufficiently well known in the context of complex watches.

In the case of integrating this mechanism into a clock or watch having a perpetual calendar which is favoured here, it will be sufficient because of the gear drive mechanism described above to set the date in the clock or watch to automatically set the correct lunar phase; or else, sufficiently well known setting devices can be provided in the clock or watch. The mechanism for the display of the lunar phases can thus be inserted directly into other working modules of a clock or watch.

Figure 4A:
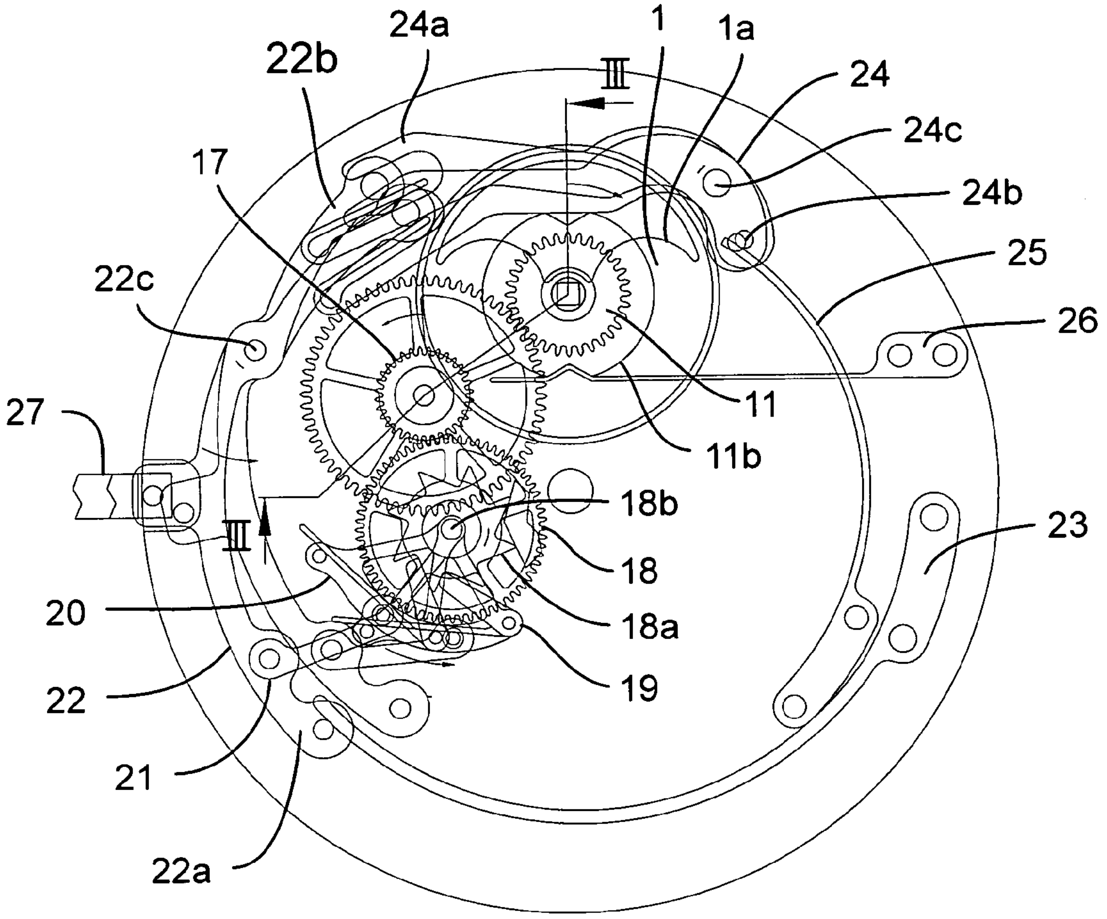
In FIGS. 4*a* to 4*c*, alternative adjusting mechanisms for setting the stationary position of the lunar display disc are sketched.
Figure 4B:
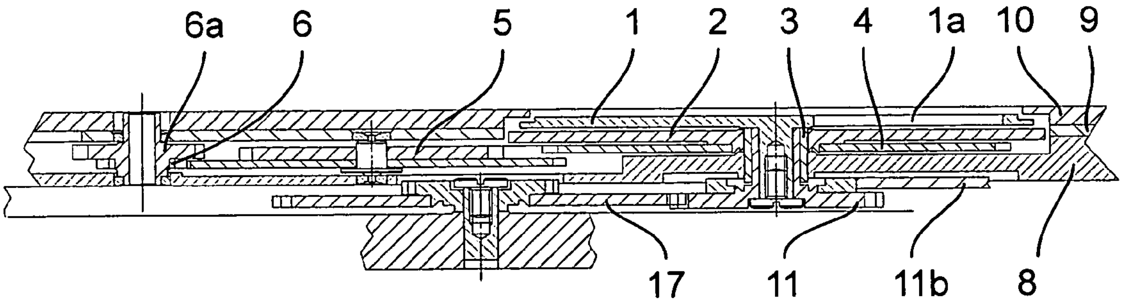
Figure 4C:
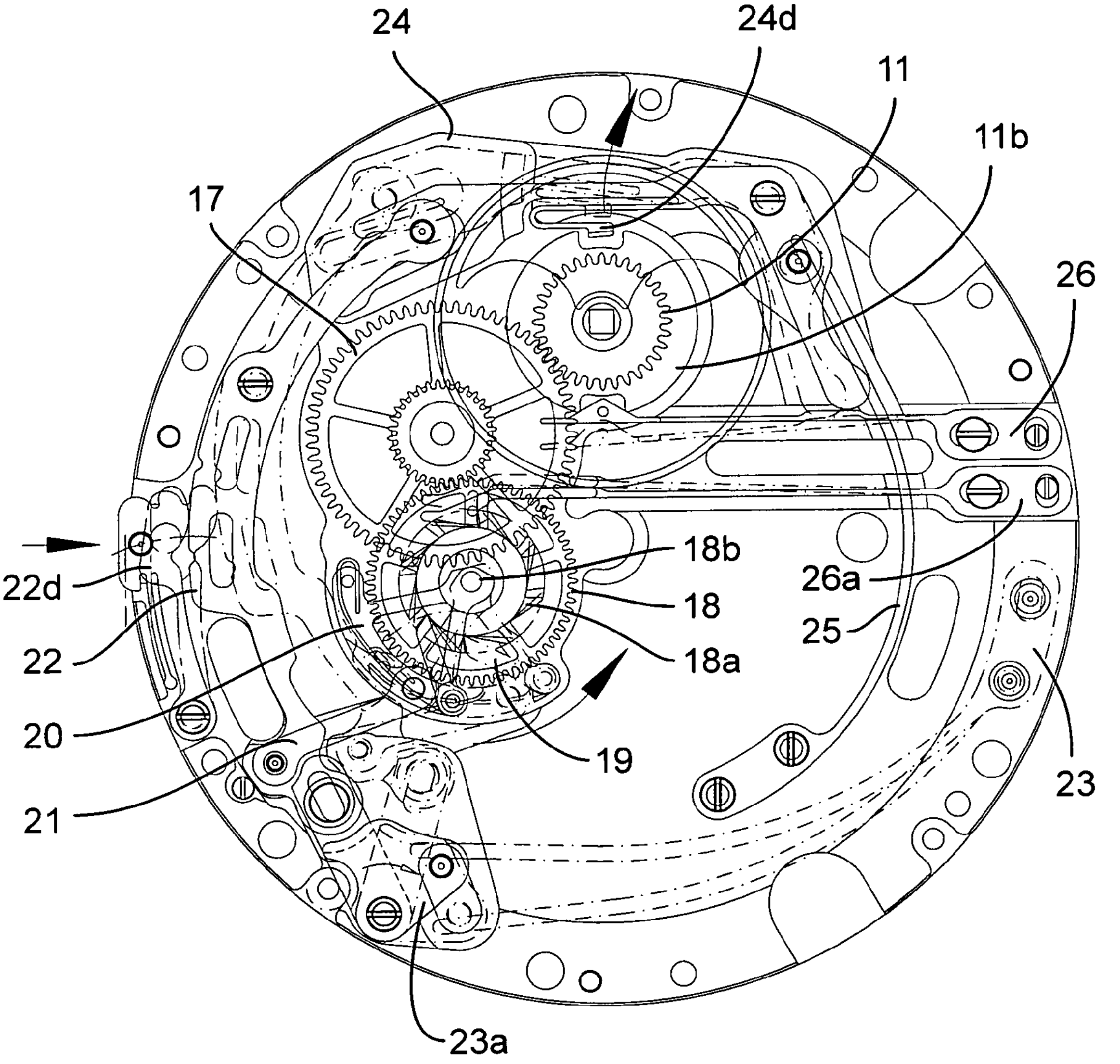

FIGS. 4*a* to 4*c* represent alternative setting mechanisms used to adjust the stationary position of the lunar display disc 1, the adjustment here being operated by push-pieces.

In order to first discuss a first alternative shown in FIGS. 4*a* and 4*b* in a top view and in section, attention is called to the structure surrounding pipe 3, which is somewhat different here but corresponds with the above embodiment. Here the mechanism has a lunar disc 2 which in normal operation is rotated by the lunar disc wheel 4 that is attached to it, about pipe 3 that is attached to plate 8. The lunar display disc 1 is rotatably mounted within pipe 3 and can be turned by 180° in each of two steps by lunar display wheel 11.

To this end, this embodiment has a push-piece 27 with a lever and rocker mechanism 19-26 and associated gear train 17-18 that drives the lunar display wheel 11 when this undergoes adjustment, and can for instance be inserted between the basic clockwork and a perpetual calendar module not shown in FIGS. 4*a* to 4*c*.

Here the lunar display wheel 11 is engaged with an intermediate adjusting wheel 17 which in turn is engaged with an adjustment drive wheel 18 supporting a sawtooth wheel 18*a*. The latter is engaged by a pawl 19 pivoted on a roughly triangular crank 20 which itself is mounted so as to pivot about the centre of rotation 18*b* of the adjustment drive wheel 18. Via a connecting piece 21 articulated at the two parts, crank 20 is linked to one end 22*a* of a control lever 22. This end 22*a* is solicitated outward by a first spring 23, the control lever 22 being operated through push-piece 27, that is, being pivoted about a centre of rotation 22*c*, causing the end 22*a* of control lever 22 to move inward against the action of spring 23. The other end 22*b* of control lever 22 is articulated at an end 24*a* of a blocking lever 24 that is pivoting about a centre of rotation 24*c*. The arm of this lever 24 which, as seen from the centre of rotation 24*c*, is located on the side of end 24*a*, moreover is provided with a projecting clickstop engaged with one of two notches 180° apart on a locking disc 11*b* solidly fixed to the lunar display wheel 11. The other end 24*b* of the blocking lever 24 is solicited outward by a second spring 25, at the same time pushing the projecting clickstop of blocking lever 24 into the notch of blocking disc 11*b* and soliciting the end 22*b* of control lever 22 inward, that is, in the same direction as the action of the first spring 23. A third spring 26 is mounted in such a way that a projection present at its free end is engaged with the second notch in the blocking disc 11*b* so as to secure the position of this disc.

The mechanism functions in such a way that pushing the push-piece 27 causes the end 22*a* of control lever 22 to retract pawl 19 counterclockwise via the connecting piece 21 and crank 20 by one tooth along the sawteeth of sawtooth wheel 18*a*, as indicated by dashed lines with the displaced positions of these components in FIG. 4*a*. At the same time, end 22*b* of control lever 22 lifts the blocking lever 24 from the periphery of blocking disc 11*b* so that its projecting clickstop emerges from the notch in this disc 11*b* and liberates it. Then only the third spring 26 remains to hold the blocking disc 11*b* in its position. However, the force of this spring is smaller than that of the first spring 23 and second spring 25, hence the first spring 23 (and the second spring 25) push the control lever 22 back into its original position as soon as push-piece is no longer pushed, and this causes the pawl 19 engaged in its teeth to turn the sawtooth wheel 18*a* by the space of one tooth. This causes the adjustment drive wheel 18 to be rotated through a corresponding angle determined by the number of teeth of wheel 18*a*. Via the intermediate adjusting wheel 17, finally, the adjustment drive wheel 18 rotates the lunar display wheel 11, and thus the lunar display disc 1, through 180° if, depending on said angle, the intermediate adjusting wheel 17 has gears suitable for this rotation. The blocking disc 11*b*, and thus the lunar display disc 1, are then secured against unwanted rotation by renewed engagement of the projecting clickstop into the blocking lever 24 and of the projection on the third spring in its notches. Slow release of push-piece 27 in this design will cause an equally slow rotation of the lunar display disc 1 in dial 10 of the clock or watch, providing a playful effect.

FIG. 4*c* represents an alternative pushing mechanism in the sense that a few pieces can be differently shaped for an optimisation, but the operating principles are the same as those of the preceding embodiment. On one hand, a lever 22*d* can be inserted between push-piece 27 and control lever 22, on the other hand the first spring 23 may solicit, not directly the end 22*a* of the control lever but a turning lever 23*a* articulated to it. More particularly, with a further blocking spring 24*d* on blocking lever 24 intended to engage into the notch in blocking disc 11*b* and with an extension of blocking lever 24 intended to make it act on the third spring 26, blocking disc 11*b* can be released from both sides via a push-piece 27 while in this case this disc is secured by an additional spring 26*a* soliciting the saw-tooth wheel 18*a*. When releasing push-piece 27, its elastic force is again overcome by the forces of the first (23) and second (25) spring, and again the gear train from adjustment drive wheel 18 to lunar display disc 1 is rotated as described above. However, this configuration with blocking spring 24*d* and the altered disposition of the third spring 26 with its projection yields a better security against overwinding of the lunar display disc 1 during the switching operation, because blocking spring 24*d* arrests the rotation of blocking disc 11*b* and the projection present on the third spring 26 defines its final position. Further, similar changes are of course possible without detriment to the inventive concept.

An overwinding protection of the lunar display disc 1 that is designed according to these principles can basically be applied in general to any kind of rotatably mounted disc or wheel that first is accelerated and then braked. Another application would be the mechanism for a large-sized display according to the European patent application EP 03 020 661.9.

Figure 5A:
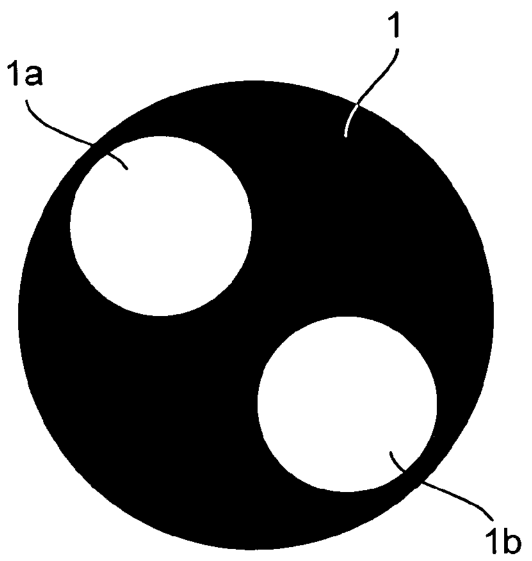
FIGS. 5*a* to 5*c* schematically illustrate the principle of a further embodiment of such a mechanism having a lunar display disc with two windows and a lunar disc with associated graphic design where the lunar phases are displayed for the northern and southern hemisphere simultaneously.
Figure 5B:
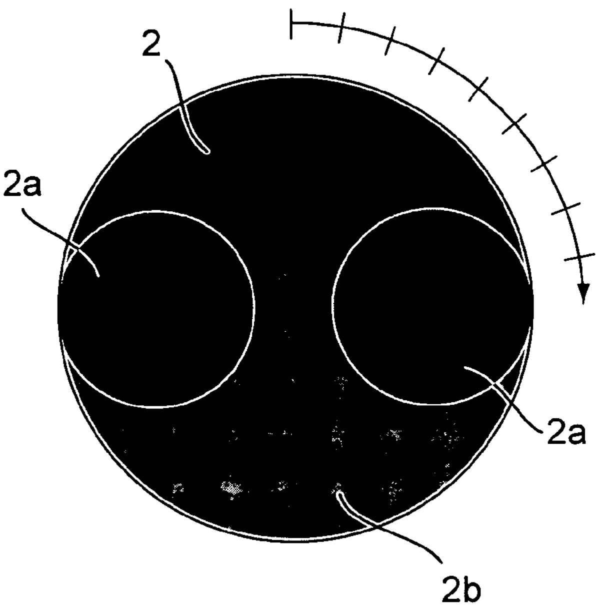
Figure 5C:
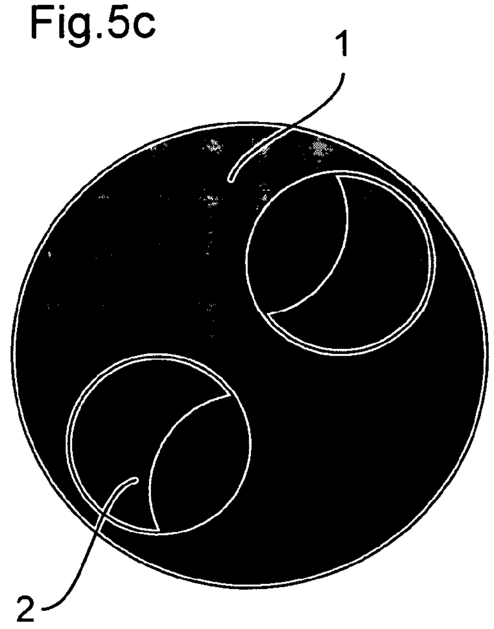

A further embodiment of a mechanism according to the invention is illustrated schematically in FIGS. 5*a* to 5*c*. Here the lunar display disc 1 has two windows 1*a* and 1*b* which, according to FIG. 5*a*, advantageously are designed as circular areas representing the lunar surface, and situated oppositely at equal distances from the centre of disc 1. Lunar disc 2 has an associated graphic design consisting for instance of two dark circular areas 2*a* which are applied against a bright background 2*b* and have the size of windows 1*a* and 1*b* of lunar display disc 1, as shown in FIG. 5*c*. These dark circular areas are also situated oppositely at the same distances from the centre of disc 2, matching windows 1*a* and 1*b* in the lunar display disc 1.

The relative motion of lunar display disc 1 and lunar disc 2 mentioned above that is needed in normal operation of the mechanism is realised in this embodiment by a rotation of lunar display disc 1 (normally, clockwise), so that the dark circular areas 2*a* will become fully visible in windows 1*a* and 1*b* when overlapping with them. Further rotation successively reveals the bright background 2*b* of the lunar disc 2, which in view of the equally dark surface of lunar display disc 1 produces a display of the lunar phases visible in the upper half of the lunar display disc 1 for the northern hemisphere und in its lower half for the southern hemisphere, as indicated in FIG. 5*c*. This corresponds to the configuration known from the European patent application EP 1 445 672 of IWC.

However, it has already been mentioned that in this configuration the crescents are reproduced, only in a basically correct way for each hemisphere but not accounting for the inclination of the crescents seen in reality by an observer located at any particular latitude, and therefore, a mechanism according to the invention in this embodiment has a lunar disc 2 that can be rotated and assume a number of stationary positions so as to achieve the most realistic possible representation in this respect. The disc, here the lunar disc 2, that is adjustably mounted thus has a multitude of stationary positions always spaced apart by the same angular distance, and during operation of the mechanism is in the currently adjusted position that corresponds to the current latitude, so as to provide a more realistic display of the lunar phases as seen at this point on earth.

Figure 6:
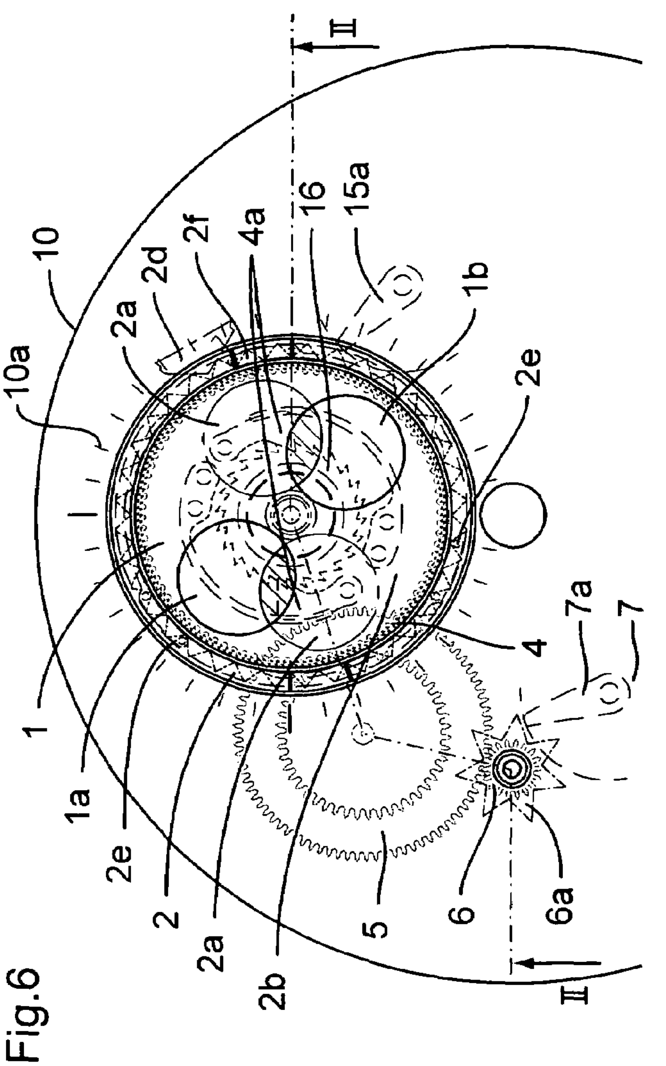
FIG. 6 is a plan view of the lunar phase display mechanism of FIGS. 5*a* to 5*c* including an example of the gear train driving said lunar display disc, as well as of an adjusting mechanism for setting the stationary position of the lunar disc.
Figure 7:
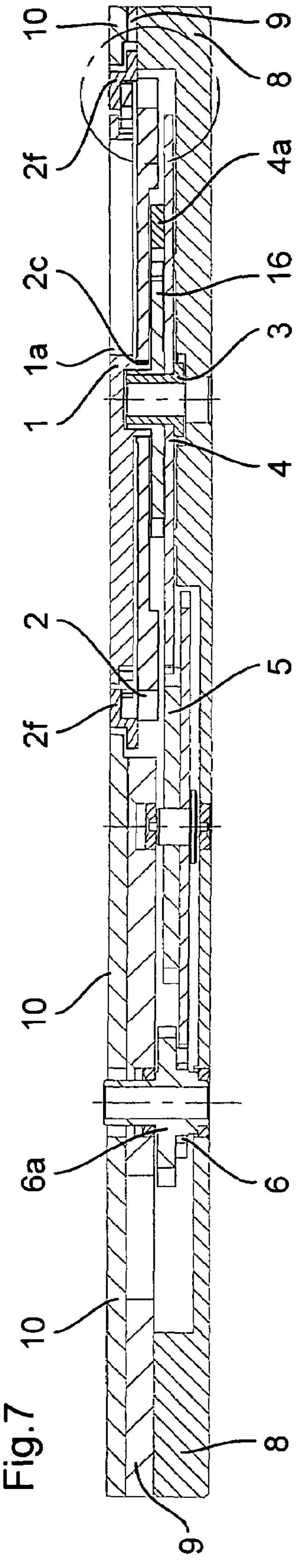
FIG. 7 is a section along the line II-II through the mechanism of FIG. 6.

A mechanism suitable for this embodiment is represented in a top view and in section in FIGS. 6 and 7.

The two figures again show, on one hand to the left an example of the gear train driving the lunar disc 2, and on the other hand to the right an example of an adjusting mechanism intended to set the stationary position of lunar disc 2.

Here again, the mechanism preferably is integrated into a clock or watch with perpetual calendar (not represented). FIG. 6, analogously to FIG. 2, is a top view revealing the parts situated beneath dial 10 of the clock or watch.

The drive train from the 24-hour wheel 7 to the lunar phase intermediate wheel 5 or lunar disc wheel 4 is entirely analogous to that described above, and requires no further explanation, see FIG. 6.

The gear train of the adjusting mechanism intended to set the stationary position of the adjustably mounted disc, here the lunar disc 2, in this embodiment does not need a special transmission inasmuch as the lunar disc 2 here is supposed to be advanced in small steps. It therefore is shaped as a lunar disc star 2 with teeth into which a pawl 2*d* securing the position and a simple finger 15*a* of the corrector wheel 15 driven by the crown are directly engaged for its advance. Relative to the preceding embodiment, this gear train can be of simpler design, therefore, and causes the lunar disc 2 for one revolution of the crown to advance through an angle that can be selected by the number of teeth at its periphery. In the example represented, the lunar disc has 36 teeth and can be advanced in steps of 10° corresponding to degrees of latitude on the earth.

Even in this case, of course, the adjusting mechanism can be realised with push-pieces. To this effect, it would suffice to adapt the mechanism described above for the first embodiment in such a way to the present case that actuation of the push-piece will cause the lunar disc star to advance by one step.

Owing to the inversion between the disc that normally is rotating, and the disc that is adjustable, the differences of the mechanism relative to that of the first embodiment reside primarily in the kinematic link between pipe 3, lunar display disc 1 and lunar disc 2.

On one hand, in the embodiment according to FIGS. 6 and 7 the lunar disc wheel 4 that is driven by the drive gear train 5 to 7 is not attached to the lunar disc 2 but to the pipe 3 which again is mounted rotatably, since here it is not the lunar disc 2 but the lunar display disc 1 that in normal operation of the mechanism is rotated.

On the other hand, a coupling mechanism is needed in this case, since in an adjustment carried out in small steps, the symmetric conditions found in the 180° rotation of the previous case are lost, and hence the lunar display disc 1 should be rotated along with the lunar disc 2 when this is adjusted in order to preserve the crescent displayed and advantageously avoid their separate adjustment.

Such a coupling mechanism is found at the two discs 1, 2 and is designed so that these discs will rotate simultaneously when the stationary position of the adjustably mounted disc is adjusted, while the gear train driving the disc that is rotating during normal operation of the mechanism is uncoupled. During normal operation of the mechanism, to the contrary, this gear train drives the rotating disc while this is uncoupled by the coupling mechanism from the adjustably mounted disc.

FIGS. 6, 7 as well as 8*a* and 8*b* show a coupling mechanism specifically suited to the present embodiment, and consisting of two separate clutches.

On one hand a ratchet wheel 16 is fixed above the lunar disc wheel 4; it is mounted rotatably about the pipe 3 via through hole 2*c* in the lunar disc 2, and is solidly attached to the lunar display disc 1 while enveloping the lunar disc 2 that is rotatably mounted there. Pipe 3 is solidly attached to lunar disc wheel 4 and mounted rotatably about a pin attached to plate 8. The saw teeth of ratchet wheel 16 are oriented so that the ratchet wheel 16 and thus the lunar display disc 1 are rotated by pawls 4*a* attached to the edges of the lunar disc wheel 4 when this is driven clockwise in normal operation of the mechanism. However, while the lunar display disc 1 or ratchet wheel 16 are rotated clockwise during adjustment of lunar disc 2, as described below, this has no effect on the drive gear train which in this case is uncoupled by the first clutch consisting of ratchet wheel 16 and the pawls 4*a* and is secured against undesirable rotation by catch 6*b*.

Figure 8B:
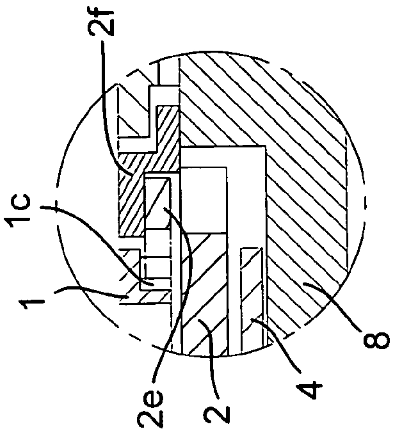
FIGS. 8*a* and 8*b* represent a coupling mechanism for the embodiment of FIGS. 6 and 7, FIG. 8*b* being a detail of FIG. 7 while in FIGS. 8*c* and 8*d* an alternative coupling mechanism is sketched.

On the other hand, a second clutch is provided between the lunar display disc 1 and the lunar disc 2. Analogously to the first clutch, this consists of pawls 2*e* which here are attached to the periphery of lunar disc 2, and of a corresponding set of sawteeth 1*c* present in the lower segment of the periphery of the lunar display disc 1, as seen from FIG. 8*b* but not visible on dial 10 of the clock or watch. The sawteeth 1*c* of the lunar display disc 1 and associated pawls 2*e* on lunar disc 2 are oriented in such a way that during clockwise adjustment of the lunar disc 2 via the crown or via the corrector wheel 15 the lunar display disc 1 is rotated together with the lunar disc 2 in order not to lose the setting of the lunar phase being displayed. In normal operation of the mechanism, to the contrary, the lunar disc star 2, that is, the lunar disc, is immobile and held in position by clickstop 2*d*, since the second clutch is disengaged when the lunar display disc 1 is rotated clockwise by the drive gear train 5 to 7.

Figure 8D:
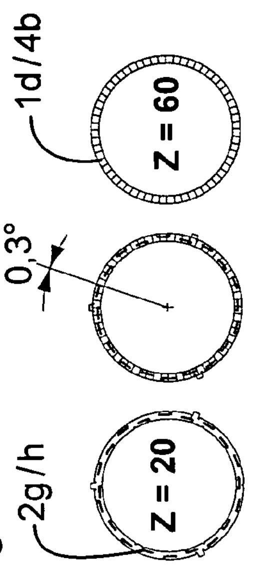
Figure 8A:
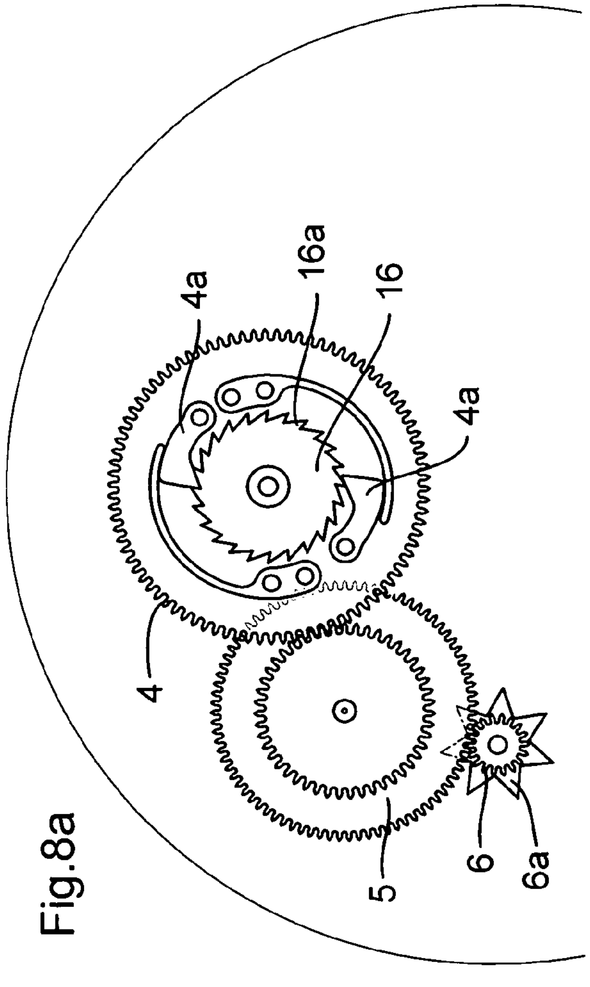
Figure 8C:
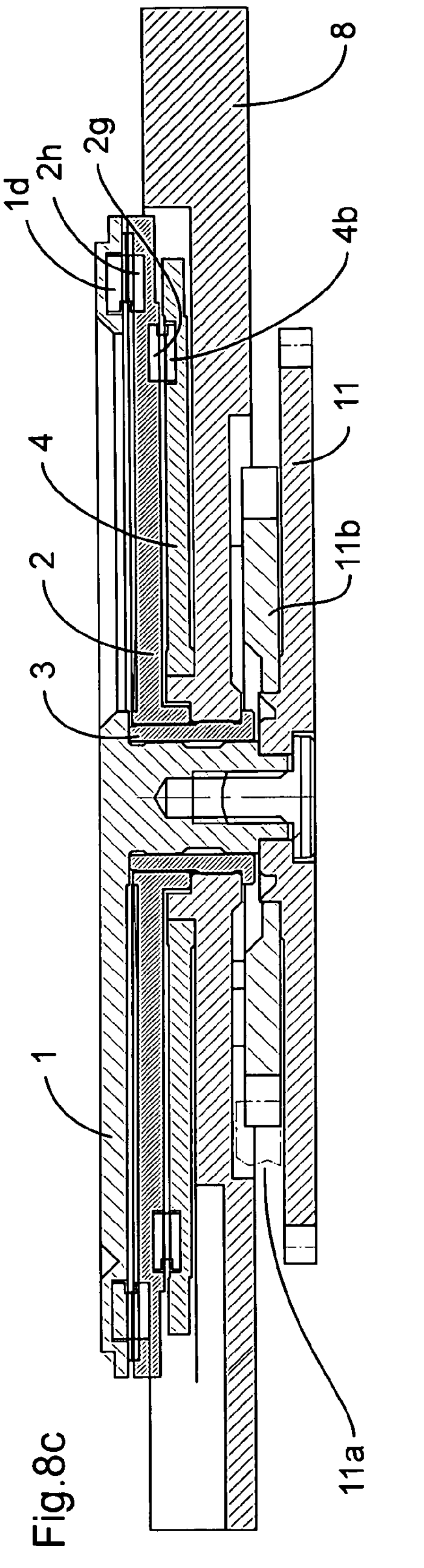

An alternative realisation of a suitable coupling mechanism is represented in FIGS. 8*c* and 8*d*. FIG. 8*c* shows a mechanism that corresponds to the first embodiment and has been described in particular in connection with FIGS. 4*a* and 4*b* where in normal operation the lunar disc 2 is rotated by the lunar disc wheel 4 about the pipe 3 fixed to plate 8 while the lunar display disc 1 rotatably mounted within pipe 3 can be adjusted via the lunar display wheel 11, in the present case in several steps. The arrangements below, however, can also be applied by analogy to the embodiment described above.

In this coupling mechanism which for instance is known in principle from the German patent document DE 3 205 821 of IWC, sawtooth-shaped recesses attached to the edge of the wheel or disc surface are used in combination with inclined spring arms, instead of sawteeth at the wheel's periphery and associated pawls. It can be seen from FIG. 8*c* that in this example the lunar disc 2 has inclined spring arms 2*g* and 2*h*, both on its bottom and on its top surface; they are attached with one end to this disc while the free end points upward. Accordingly, the lunar disc wheel 4 or lunar display disc 1 have sawtooth recesses 4*b* or 1*d* at the edge of their top or bottom surface into which the spring arms 2*g* and 2*h* can become engaged. The inclination of the spring arms and the sawtooth shape of the recesses is such that the functionality described in the instance of above coupling mechanism is achieved.

Thus, the sawtooth-shaped recesses 4*b* at the edge of the lunar disc wheel 4 and the lower spring arms 2*g* at the lunar disc 2 should be provided with a clockwise upward inclination so that the lunar disc wheel 4 will drive the lunar disc 2 in this direction. However, when the lunar disc 2 is rotated clockwise together with lunar display disc 1 when the latter is adjusted, the lunar disc wheel 4 and thus the drive gear train 5 to 7 are not moved along.

On the other hand, the sawtooth-shaped recesses 1*d* at the lunar display disc 1 and the upper spring arms 2*h* at the lunar disc must have a clockwise downward inclination, so that the lunar display disc 1 when being adjusted will cause the lunar disc 2 to rotate with it in this direction. During normal rotation of the lunar disc 2, the lunar display disc 1 again is not rotated along with it, since it is secured for instance by a catch 11*a* engaged in a star 11*b* attached to the lunar display wheel 11 and the clutch is disengaged.

It can be seen from FIG. 8*d* that in this coupling mechanism the spring arms may preferably be attached to one of the wheels along two circles having slightly different radii so that a larger number of spring arms such as 20 springs can be placed. The sawtooth-shaped recesses on the other wheel have a corresponding width, and consist for instance of 60 recesses. It can also be seen from FIG. 8*d* that this produces an efficient reduction of coupling play, which in this instance amounts to only 360°/60/20=0.3°. This is important, since during adjustments of the adjustably mounted disc and associated shifts of the normally rotating disc, an error arises from he transmissions in the gear train, from the tooth play of the wheels as well as from the coupling play at the two clutches that will produce a relative shift of lunar display disc 1 and lunar disc 2, that is, a deviation in the lunar phase display, when the adjustable disc is adjusted repeatedly. If this can never be avoided entirely in a mechanical display, the error arising in such a coupling mechanism can at least be reduced.

Otherwise, of course, in this coupling mechanism the arrangement of sawtooth-shaped recesses on one of the wheels and of spring arms on the other wheel can be interchanged while retaining the corresponding inclinations, in the same way as in the coupling mechanism that had been described first, where the sawteeth at the periphery of the wheel and the pawls could each be attached to the opposite wheel.

A mechanism according to the invention may further comprise means, particularly so in the embodiment having a large number of stationary positions of the adjustably mounted wheel, to indicate the angular position of the adjusted stationary position that corresponds to the latitude or hemisphere selected. It is apparent from FIGS. 6, 7 and 8 that this can be done with an outer edge 2*f* that is present at the adjustably mounted disc and is specifically designed, in particular having for instance two lines symbolising the equator which, as shown in FIG. 6, together with indexing lines 10*a* on dial 10 represent an indication of inclination.

In the embodiment according to FIGS. 6 and 7, the specifically designed edge is provided as a raised edge 2*f* at the outer periphery of lunar disc 2 and envelops the lunar display disc 1 at the level of dial 10. In embodiments where the lunar display disc 1 is the adjustably mounted disc, the specifically designed edge may be an integral part of this disc 1.

A further embodiment of a mechanism according to the invention can be obtained in the realisations corresponding to FIGS. 6 and 7, by simple interchange of the rotating disc and adjustable disc, in which case the direction of rotation of the lunar disc—which then would normally be the rotating disc—must be counterclockwise, that is, the opposite of that of the lunar display disc 1 in FIG. 6. A corresponding gear train is readily realised when following the above description.

Starting again from the embodiment according to FIGS. 6 and 7, a further realisation is conceivable by changing the background scene on the adjustable lunar disc 2. The graphic design of the lunar disc 2 generally comprises at least one dark region 2*a* symbolising the part of the lunar surface that is not illuminated, and at least one bright region 2*b* symbolising the part of the lunar surface that is illuminated. The dark region 2*a* can be selected as in the instance of FIGS. 5*a* to 5*c*, 6, and 7, in harmony with the top surface of the lunar display disc 1 visible on dial 10 of the clock or watch and is facing away from the lunar disc 1.

Figure 5D:
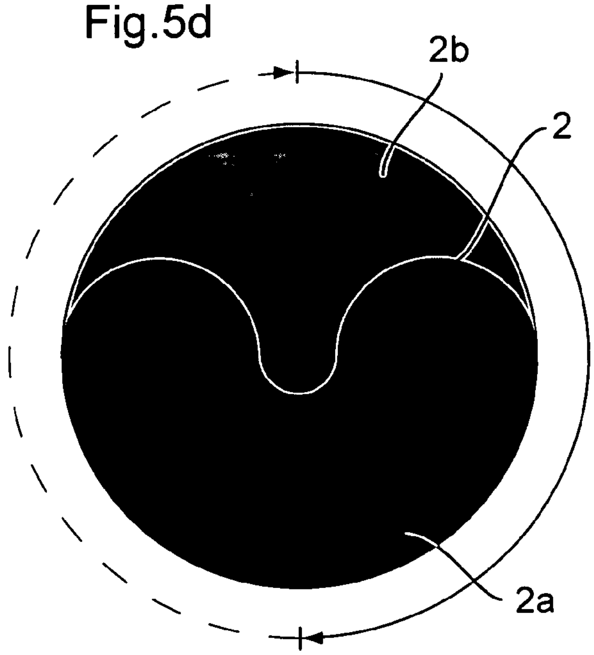
FIG. 5*d* illustrates a lunar disc that can also be used in such a mechanism in combination with a lunar display disc having two windows.

The graphic design of lunar disc 2 may now be the subject of numerous modifications without affecting the function of lunar disc 2 or the basic idea of the present invention. Thus, the position, size or colour etc. of the corresponding regions on disc 2 may be altered, generally their shape as well. One of the many conceivable alternatives for a graphic design of lunar disc 2 is represented as an example in FIG. 5*d*.

In this case the graphic design of lunar disc 2 consists of a dark region 2*a* and a bright region 2*b* on the lunar disc 2, these two regions being separated by two arched separating lines having a radius matching the size of windows 1*a* and 1*b* of the lunar display disc 1. The background of the surface of lunar disc 2 thus is divided into a bright half and a dark half, the dark region on each side to the left and right of the centre of disc 2 being extended by semicircles each matching the size of windows 1*a* and 1*b*, as can be seen from FIG. 5*d*.

Such a lunar disc can be employed in combination with a rotating lunar display disc 1 according to the embodiment of FIGS. 6 and 7, where its adjustment to two stationary positions 180° apart must be considered in particular, for instance one facing up and one facing down, since a display indicating the inclination of the crescents cannot be realised here owing to a lack of symmetric conditions.

It has already been apparent from earlier statements that the mechanism can be realised in a large number of further embodiments. This is possible since—as mentioned—only the relative motion of the two discs 1 and 2 is important, the normally rotating disc and the adjustable disc being interchangeable in principle. Moreover, the design of the window or windows of the lunar display disc 1 as well as the design of the background scene of the lunar disc 2 is open to a number of modifications and leads to further possible combinations. More particularly, round windows in the lunar display disc 1 in combination with dark circles on the lunar disc 2 as well as arched windows in combination with bright circles should be considered, as well as the possibility to use only one or two round windows, possibly in combination with an arched background scene; in any case the interchange of rotating and adjustable disc should be considered.

One skilled in the art will find it easy in view of the above teaching to realise all these embodiments, for instance the combination of an adjustable lunar display disc 1 with just one round window, combined with a lunar disc 2 rotating counterclockwise with an image consisting of two dark circles 2*a* on a white background 2*b*.

It can also be gleaned from the above description that for the present aim of a realistic display of the lunar phases, and more particularly of their inclination, not all possible combinations will make sense inasmuch as the symmetry relations will interfere. For instance, an inclination display in several steps cannot be realised in the case of an arched window in lunar display disc 1 combined with a background scene of bright circles on lunar disc 2. The same holds true for the case of an arched background scene on lunar disc 2 in combination with a lunar display disc 1 having two round windows. This is valid analogously for further corresponding embodiments.

The corresponding limitations also apply when interchanging the rotating and adjustable disc, where again not all possible combinations will fit the desired goal.

It had been mentioned at the outset that a mechanism where the drive gear train of the rotating disc is such that the direction of rotation of the disc can be inverted may also be used for a separate and basically correct display of the lunar phases as seen from the two hemispheres. Here again it is possible to do justice in the display to the different appearance of the lunar phases on the northern and southern hemisphere, however without accounting for the angle of inclination, since one has to do with a simple symmetric inversion of the display.

Figure 9A:
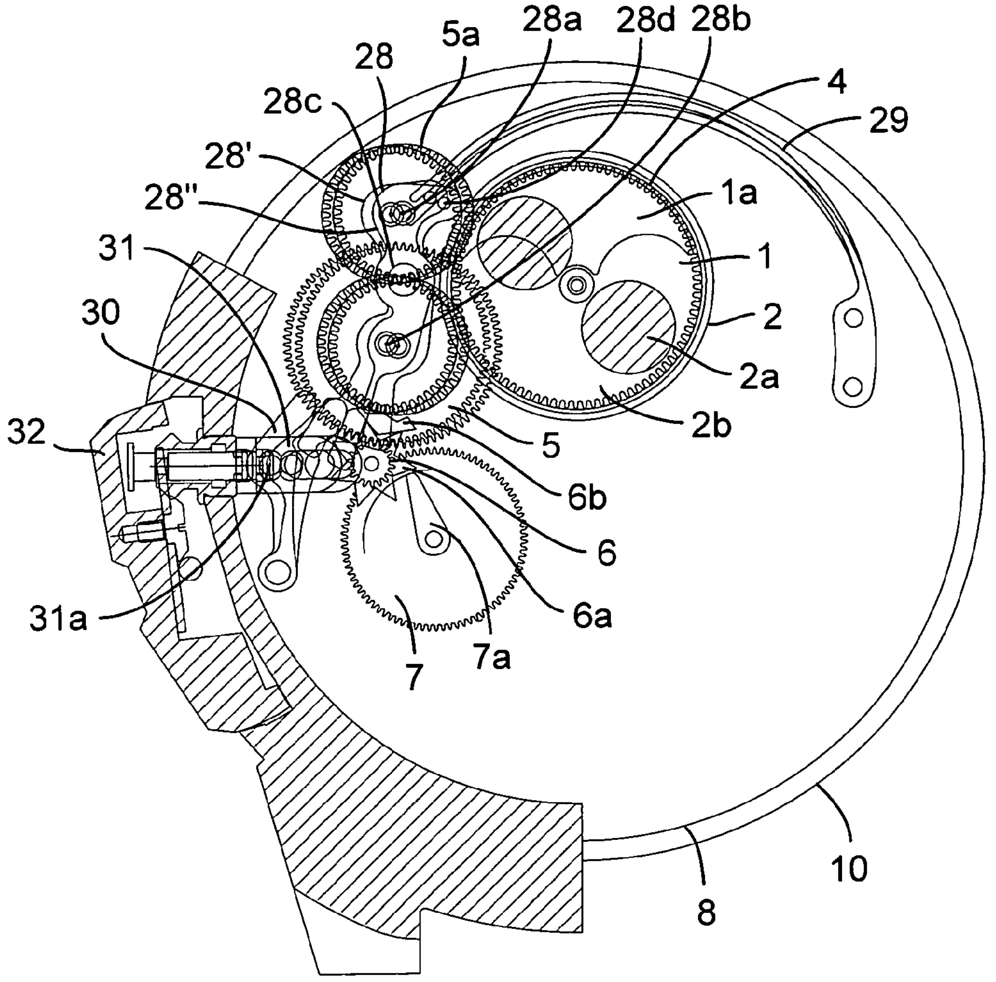
FIGS. 9*a* to 9*d* represent by way of example a further embodiment of a mechanism according to the invention which in this case admits a reversal of the direction of rotation of the lunar disc.

A specific embodiment will be explained in the instance of FIGS. 9*a* to 9*d*, where the same reference symbols again denote the same or corresponding components. FIG. 9*a* is a top view of a realisation analogous to the first embodiment according to FIGS. 2 and 3. What follows, however, can be applied to the full extent to all other embodiments mentioned above, since in all cases the normally rotating disc is driven via the lunar disc wheel 4, and the explanations following below refer only to the drive of this wheel but not to the parts following after the lunar disc wheel 4 in the direction of driving action.

As explained in the first embodiment, again a 24-hour wheel 7 with finger 7*a* making one full revolution in 24 hours drives a weekday star 6*a* mounted on a weekday wheel 6, the star being secured against unintended rotation by a catch 6*b*. The weekday wheel 6 in turn is able to drive a lunar disc wheel 4 via a lunar phase intermediate wheel 5. In contrast to embodiments described previously, however, a reverser wheel 5*a* rather than the lunar phase intermediate wheel 5 may also drive the lunar disc wheel 4.

To this effect, the lunar phase intermediate wheel 5 and the reverser wheel 5*a* are attached in two bearings 28*a* and 28*b* to a reverser 28 in such a way that these wheels are mutually engaged. The reverser 28 moreover is pivoted about a point of rotation 28*c* between the two bearings 28*a* and 28*b*. Using a bistable lever or key 32 attached to the case of a clock or watch holding the mechanism, one can swivel the reverser about the point of rotation 28*c* so that it will be in one of two stable positions 28', 28".

Figure 9B:
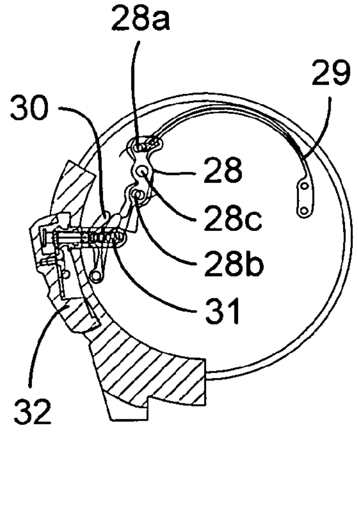
Figure 9C:
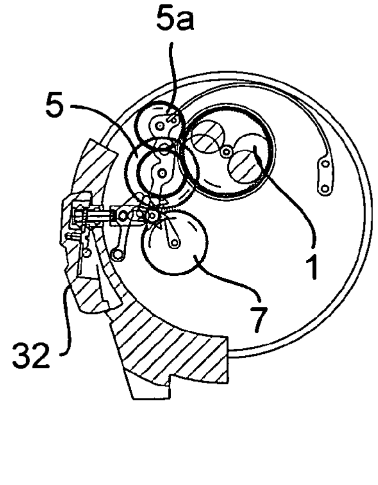

In these two stable positions, which are seen, both in FIGS. 9*a* and 9*b* (both positions) and in FIGS. 9*c* (position 28') and 9*d* (position 28"), the weekday wheel 6 is engaged with the lunar phase intermediate wheel 5. True, in the first position 28' the lunar phase intermediate wheel 5 is in direct engagement with the lunar disc wheel 4 while the reverser wheel 5*a* in this position is idle, that is, not engaged with the lunar disc wheel 4. In the second position 28", the lunar phase intermediate wheel 5 is not engaged with the lunar disc wheel 4, since it has been swiveled away from it, but drives this wheel indirectly via the reverser wheel 5*a* now being engaged with this wheel, since it has been swiveled toward it by the reverser 28. The direction of rotation of the lunar disc wheel 4 has therefore been reversed, as indicated by arrows in FIGS. 9*c* and 9*d*.

This is achieved by actuating a lever or key 32 and moving a slide 31 attached to them in the direction of the interior of the clock or watch. A pivoted lever 30 which is articulated via a pin 31*a* on slide 31 is also pushed inward then. Lever 30 in this case solicits the arm of reverser 28 that carries the lunar phase intermediate wheel 5, and causes it to swivel inward so that reverser 28 changes into its first position 28', and only the lunar phase intermediate wheel 5 is in direct engagement with the lunar disc wheel 4.

If to the contrary slide 31 is moved outwardly by the lever or key 32, which corresponds to the second position 31" shown in FIG. 9*a* with solid lines, then lever 30 is no longer solicited by slide 31, and thus reverser 28 on the side of the lunar phase intermediate wheel 5 is no longer solicited by lever 30. Then a spring 29 with a pin 28*d* can for instance solicit the arm of reverser 28 that supports the reverser wheel 5*a*, in such a way that this arm, and thus the reverser wheel 5*a*, will be pushed against the lunar disc wheel 4. This corresponds to the second position 28", and the lunar phase intermediate wheel 5 drives the lunar disc wheel 4 indirectly via reverser wheel 5*a*, that is, in the opposite direction of rotation.

A corresponding bistable lever or key mechanism is known for instance from the Swiss patent application 0899/03 of IWC; the reverser 28 in its cooperation with spring 29 and with the lever or key 32 with slide 31 is presented in detail in FIG. 9*b*.

Figure 9D:
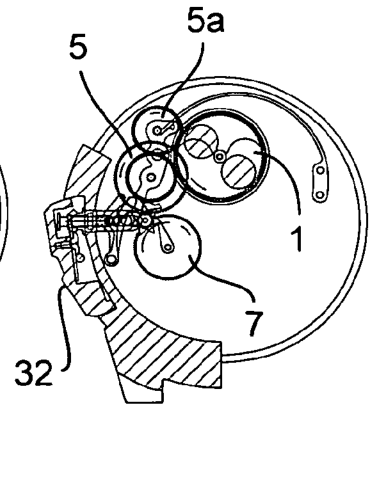

As illustrated in FIGS. 9*c* and 9*d*, the selected direction of rotation or indicated hemisphere are directly visible from the position of the bistable lever or key 32. For this purpose the ends of the lever or the watch case can be provided with the corresponding lettering, for instance N and S.

With the mechanism for lunar phase display according to the present invention it is possible, therefore, to display the lunar phases while allowing for the differences visible to observers on earth in the different hemispheres, and more particularly for the inclination of the crescents.

This aim is attained in a simple, efficient and economic way, while the invention can be used in a variety of ways, for instance in the perpetual calendars in clocks and watches, instrument panels etc.

To this end the mechanism either has a disc which can be brought in a simple way into one of two or more stationary positions in order to select the display configuration, or makes it possible to adjust the direction of rotation of the rotating disc to the configuration that should be displayed.

Different designs of the background on the lunar disc or of the window in the lunar display disc lead to a large variety of possible representations of the lunar phases.

The invention claimed is:

1. A lunar phase display mechanism, comprising:

a lunar display disc having at least one window formed therein;

a lunar disc mounted beneath and concentrically to the lunar display disc, the lunar disc being visible in part through the least one window in the lunar display disc;

a gear train that, during normal operation of the lunar display mechanism, rotatably drives one of the lunar display disc and the lunar disc while the other of said discs remains stationary; and an adjusting mechanism operable to place the stationary disc into one of a plurality of stationary angular positions.

2. The mechanism according to claim 1, wherein the adjusting mechanism does not affect the position of the disc driven by the gear train.

3. The mechanism according to claim 2, wherein the plurality of stationary positions comprise two stationary positions separated from one another by an angle of 180°.

4. The mechanism according to claim 1, wherein the adjusting mechanism is operable to rotate the disc driven by the gear train in tandem with the stationary disc.

5. The mechanism according to claim 4, wherein the plurality of stationary positions comprise 36 stationary positions uniformly spaced at 10° intervals.

6. The mechanism according to claim 4, wherein the adjusting mechanism includes a coupling mechanism that, during adjustment of the stationary position of the stationary disc, uncouples the disc driven by the gear train from said gear train and couples said driven disk to the stationary disc.

7. The mechanism according to claim 6, wherein the coupling mechanism comprises a first clutch and a second clutch, the first clutch being positioned between the lunar display disc and the lunar disc, and the second clutch being positioned between a wheel in the gear train and the disc driven by said gear train.

8. The mechanism according to claim 7, wherein each of said first clutch and said second clutch comprise a pawl engageable with sawteeth at the periphery of one of the discs or the wheel.

9. The mechanism according to claim 7, wherein each of said first clutch and said second clutch comprise at least one inclined spring arm engageable with sawtooth-shaped recesses at the edge of the surface of one of the discs or the wheel.

10. The mechanism according to claim 1, wherein the stationary disc comprises one or more indicators of the angular position in which said disc is placed by the adjustment mechanism.

11. The mechanism according to claim 10, wherein the indicators comprise lines symbolizing different geographical latitudes.

12. The mechanism according to claim 1, wherein the adjusting mechanism is driven by a crown of a watch comprising the lunar phase display mechanism.

13. The mechanism according to claim 1, wherein the adjusting mechanism is driven by a push-piece and an associated lever or rocker mechanism of a watch comprising the lunar phase display mechanism.

14. The mechanism according to claim 1, wherein the stationary disc is the lunar display disc.

15. The mechanism according to claim 14, wherein the lunar display disc has one window with an arched design and the lunar disc has at least two bright circular areas on a dark background.

16. The mechanism according to claim 14, wherein the lunar display disc has at least one circular-shaped window and the lunar disc has at least two dark circular areas on a bright background, the dark circular areas being approximately the size of said circular-shaped window.

17. The mechanism according to claim 1, wherein the stationary disc is the lunar disc and the lunar display disc has one or two circular-shaped windows.

18. The mechanism according to claim 17, wherein the lunar disc has at least two dark circular areas on a bright background, the dark circular areas being approximately the size of circular-shaped window or windows.

19. The mechanism according to claim 17, wherein the lunar display disc has two circular-shaped windows, and the lunar disc has a dark region and a bright region, the dark and bright regions being separated by two arched separating lines each having a radius approximately matching the size of the circular-shaped windows.

20. A watch comprising a lunar phase display mechanism according to claim 1.

* * * * *